United States Patent
Liu et al.

(10) Patent No.: US 12,299,579 B2
(45) Date of Patent: *May 13, 2025

(54) ADVERSARIAL PRETRAINING OF MACHINE LEARNING MODELS

(71) Applicant: Microsoft Technology Licensing, LLC, Redmond, WA (US)

(72) Inventors: Xiaodong Liu, Redmond, WA (US); Hao Cheng, Bellevue, WA (US); Yu Wang, Bellevue, WA (US); Jianfeng Gao, Woodinville, WA (US); Weizhu Chen, Kirkland, WA (US); Pengcheng He, Sammamish, WA (US); Hoifung Poon, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,051

(22) Filed: Sep. 26, 2023

(65) Prior Publication Data
US 2024/0013055 A1  Jan. 11, 2024

Related U.S. Application Data

(63) Continuation of application No. 16/882,296, filed on May 22, 2020, now Pat. No. 11,803,758.
(Continued)

(51) Int. Cl.
*G06N 3/084* (2023.01)
*G06F 18/24* (2023.01)
(Continued)

(52) U.S. Cl.
CPC ........... *G06N 3/084* (2013.01); *G06F 18/24* (2023.01); *G06N 3/08* (2013.01); *G06N 3/088* (2013.01);
(Continued)

(58) Field of Classification Search
None
See application file for complete search history.

(56) References Cited

U.S. PATENT DOCUMENTS

2018/0053233 A1* 2/2018 Srivastava .......... G06F 16/2455

OTHER PUBLICATIONS

Devlin et al. ("BERT: Pre-training of Deep Bidirectional Transformer for Language Understanding") arXiv:1810.04805 [cs.CL], Oct. 11, 2018, (2018) (Year: 2018).*

(Continued)

*Primary Examiner* — John B Strege
*Assistant Examiner* — Elisa M Rice
(74) *Attorney, Agent, or Firm* — Rainier Patents, P.S.

(57) ABSTRACT

This document relates to training of machine learning models. One example method involves providing a machine learning model having one or more mapping layers. The one or more mapping layers can include at least a first mapping layer configured to map components of pretraining examples into first representations in a space. The example method also includes performing a pretraining stage on the one or more mapping layers using the pretraining examples. The pretraining stage can include adding noise to the first representations of the components of the pretraining examples to obtain noise-adjusted first representations. The pretraining stage can also include performing a self-supervised learning process to pretrain the one or more mapping layers using at least the first representations of the training data items and the noise-adjusted first representations of the training data items.

21 Claims, 13 Drawing Sheets

Related U.S. Application Data

(60) Provisional application No. 63/011,763, filed on Apr. 17, 2020.

(51) Int. Cl.
   *G06F 40/284* (2020.01)
   *G06N 3/08* (2023.01)
   *G06N 3/088* (2023.01)
   *G06N 20/00* (2019.01)
   *G06V 10/778* (2022.01)
   *G06V 10/82* (2022.01)

(52) U.S. Cl.
   CPC ......... *G06N 20/00* (2019.01); *G06V 10/7784* (2022.01); *G06V 10/82* (2022.01); *G06F 40/284* (2020.01); *G06T 2207/20081* (2013.01)

(56) References Cited

OTHER PUBLICATIONS

Haoming Jiang, Pengcheng He, SMART: Robust and Efficient Fine-Tuning for Pre-trained Natural Language Models through Principled Regularized Optimization. In Proceedings of the 58th Annual Meeting of the Association for Computational Linguistics, p. 21, (2020) (Year: 2020).*

Erhan et al. ("The Difficulty of Training Deep Architectures and the Effect of Unsupervised Pre-Training") Dumitru Erhan, Pierre-Antoine Manzagol, Proceedings of the Twelfth International Conference on Artificial Intelligence and Statistics, PMLR 5:153-160 (2009) (Year: 2009).*

* cited by examiner

| Model | SQuAD v1.1/v2.0 | | MNLI m/mm |
|---|---|---|---|
| | F1/EM | F1/EM | Acc |
| BERT $_{BASE}$ | 88.5/81.0 | 76.5/72.9 | 84.5/84.4 |
| BERT+ $_{BASE}$ | 89.6/82.4 | 77.8/74.0 | 85.0/84.8 |
| ALUM $_{BERT-BASE}$ | 90.8/83.7 | 80.2/76.6 | 85.8/86.1 |

FIG. 5A

| Model | BC2GM F1 | NCBI F1 | JNLPBA F1 |
|---|---|---|---|
| BERT $_{BASE}$ | 79.7 | 84.6 | 75.7 |
| ALUM $_{BERT-BASE}$ | 81.1 | 86.9 | 76.5 |

FIG. 5B

| Model | MNLI-m/MM Acc | SST-2 Acc |
|---|---|---|
| RoBERTa $_{LARGE}$ | 90.2/90.2 | 96.4 |
| RoBERTa+$_{LARGE}$ | 90.3/90.2 | 96.3 |

FIG. 5C

| Model | MNLI-m | SST-2 | QNLI | CoLA | RTE | MRPC | QQP | STS-B |
|---|---|---|---|---|---|---|---|---|
| RoBERTa $_{BASE}$ | 87.6 | 94.8 | 92.8 | 63.6 | 78.7 | 90.2 | 91.9 | 91.2 |
| ALUM $_{RoBERTa-BASE}$ | 88.1 | 95.3 | 93.1 | 63.6 | 80.2 | 90.9 | 92.0 | 91.1 |
| RoBERTa $_{LARGE}$ | 90.2 | 96.4 | 94.7 | 67.8 | 86.8 | 90.9 | 92.2 | 92.4 |
| ALUM $_{RoBERTa-LARGE}$ | 90.9 | 96.6 | 95.1 | 68.2 | 87.3 | 91.1 | 92.2 | 92.1 |

FIG. 5D

| Method | Dev | | | | Test | | | |
|---|---|---|---|---|---|---|---|---|
| | R1 | R2 | R3 | All | R1 | R2 | R3 | All |
| MNLI + SNLI + ANLI + FEVER | | | | | | | | |
| BERT $_{BASE}$ | 55.7 | 46.3 | 43.4 | 48.2 | 55.1 | 45.0 | 43.1 | 47.4 |
| BERT+$_{BASE}$ | 57.5 | 47.3 | 43.0 | 88.9 | 57.7 | 43.7 | 43.0 | 47.8 |
| ALUM $_{BERT-BASE}$ | 62.0 | 48.6 | 48.1 | 52.6 | 61.3 | 45.9 | 44.3 | 50.1 |
| BERT $_{LARGE}$(Nie et al., 2019) | 57.4 | 48.3 | 43.5 | 49.3 | - | - | - | 44.2 |
| XLNet $_{LARGE}$ (Nie et al., 2019) | 67.6 | 50.7 | 48.3 | 55.1 | - | - | - | 52.0 |
| RoBERTa $_{LARGE}$(Nie et al., 2019) | 73.8 | 48.9 | 44.4 | 53.7 | - | - | - | 49.7 |
| ALUM $_{RoBERTa-LARGE}$ | 73.3 | 53.4 | 48.2 | 57.7 | 72.3 | 52.1 | 48.4 | 57.0 |

FIG. 5E

| Method | Adversarial SQuAD | | HELLASWAG | |
|---|---|---|---|---|
| | AddSent | AddOneSent | Dev | Test |
| | EM/F1 | EM/F1 | Accuracy | Accuracy |
| BERT $_{BASE}$ | 48.9/54.0 | 59.0/64.8 | 39.5 | - |
| BERT+$_{BASE}$ | 50.1/56.2 | 60.5/65.7 | 40.3 | - |
| ALUM $_{BERT-BASE}$ | 54.6/60.4 | 63.2/69.8 | 44.0 | - |
| RoBERTa $_{LARGE}$ | 72.3/66.0 | 79.3/72.9 | 85.0 | 85.2 |
| ALUM $_{RoBERTa-LARGE}$ | 75.5/69.4 | 81.4/75.0 | 86.2 | 85.6 |
FIG. 5F
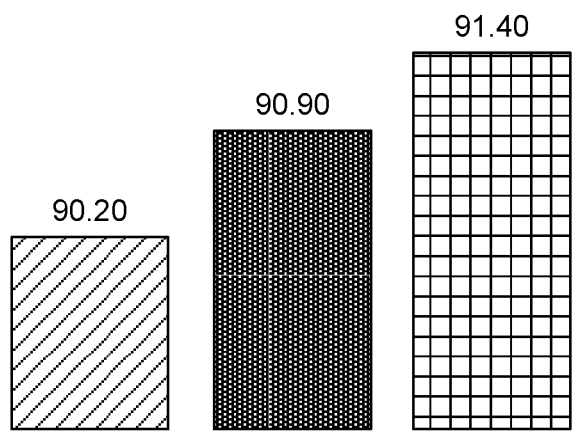
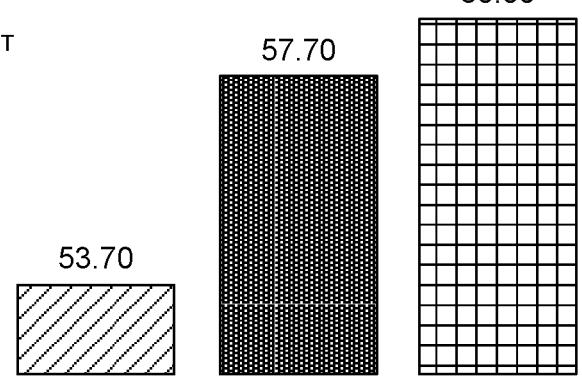
FIG. 5G

ADVERSARIAL PRETRAINING OF MACHINE LEARNING MODELS

BACKGROUND

Machine learning can be used to perform a broad range of tasks, such as natural language processing, financial analysis, and image processing. Machine learning models can be trained using several approaches, such as supervised learning, semi-supervised learning, unsupervised learning, reinforcement learning, etc. In approaches such as supervised or semi-supervised learning, labeled training examples can be used to train a model to map inputs to outputs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for training of machine learning models. One example includes a method or technique that can be performed on a computing device. The method or technique can include providing a machine learning model having one or more mapping layers, including at least a first mapping layer configured to map components of pretraining examples into first representations in a space. The method or technique can also include performing a pretraining stage on the one or more mapping more layers using the pretraining examples. The pretraining stage can include adding noise to the first representations of the components of the pretraining examples to obtain noise-adjusted first representations. The pretraining stage can also include performing a self-supervised learning process to pretrain the one or more mapping layers using at least the first representations and the noise-adjusted first representations of the components of the training data items.

Another example includes a system having a hardware processing unit and a storage resource storing computer-readable instructions. When executed by the hardware processing unit, the computer-readable instructions can cause the hardware processing unit to receive input data and process the input data using a machine learning model having a first layer and a second layer to obtain a result. The first layer can have been pretrained in a pretraining stage using virtual adversarial training for a self-supervised learning task. The computer-readable instructions can also cause the hardware processing unit to output the result.

Another example includes a computer-readable storage medium storing instructions which, when executed by one or more processing devices, cause the one or more processing devices to perform acts. The acts can include providing a machine learning model having one or more mapping layers, including at least a first mapping layer configured to map components of data items into first representations in a space. The acts can also include performing one or more initial pretraining iterations of a learning process to train the machine learning model with the first representations. The acts can also include performing noise adjustment on the first representations to obtain noise-adjusted first representations. The acts can also include performing one or more subsequent pretraining iterations of the learning process to train the machine learning model with the noise-adjusted first representations.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 5A-5G illustrate examples of experimental results obtained by machine learning models produced using the disclosed implementations.

DETAILED DESCRIPTION

Figure 1:
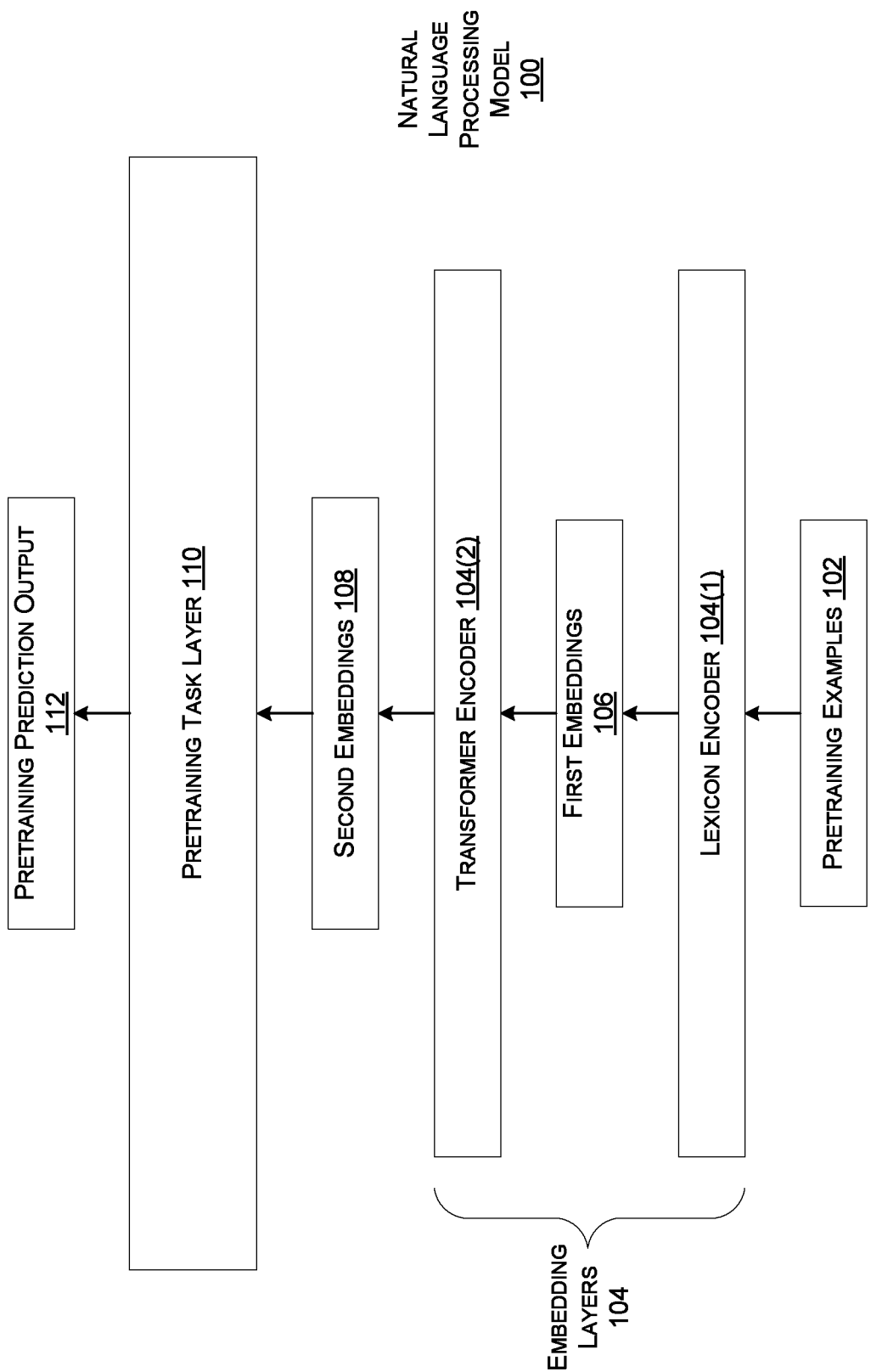
FIG. 1 illustrates an example machine learning model for pretraining, consistent with some implementations of the present concepts.

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" when used without a modifier is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models are trained on different training data or if there are underlying stochastic processes in the training process.

There are many machine learning tasks for which there is a relative lack of training data. One broad approach to training a model with limited task-specific training data for a particular task involves "transfer learning." In transfer learning, a model is first pretrained on another task for which significant training data is available, and then the model is tuned to the particular task using the task-specific training data.

The term "pretraining," as used herein, refers to model training on a set of pretraining data to adjust model parameters in a manner that allows for subsequent tuning of those model parameters for one or more specific tasks. In some cases, the pretraining can involve a self-supervised learning process on unlabeled training data, where a "self-supervised" learning process involves learning from the structure of pretraining examples, potentially in the absence of explicit (e.g., manually-provided) labels. Subsequent modification of model parameters obtained by pretraining is referred to herein as "tuning." Tuning can be performed for one or more tasks using supervised learning from explicitly-labeled training data, in some cases using a different task for tuning than for pretraining.

Conventional techniques for training and tuning of model parameters can be susceptible to certain attacks. For instance, a carefully-constructed or "adversarial" sentence or image may "fool" a model into outputting a clearly incorrect classification for that sentence or image, even when the correct classification is readily apparent to a human user. One broad approach to developing models that are robust to such attacks is known as "adversarial" training. However, conventional adversarial training tends to hurt the ability of models to generalize, as discussed more below.

The disclosed implementations offer a mechanism for virtual adversarial pretraining of one or more mapping layers of a model. After pretraining using the disclosed techniques, the pretrained mapping layers can be tuned with a task-specific layer to perform a specific task using supervised learning. By pretraining a model the disclosed techniques, the final model may tend to both generalize well and also be robust to adversarial attacks, as discussed more below.

The following discussion provides some specific examples in a natural language processing context. However, as also discussed further below, the disclosed techniques can also be employed for other tasks besides natural language processing, such as image processing, computer vision, radar, sonar, medical scenarios, analysis of genetic markers, etc.

Pretraining Model Example

FIG. 1 illustrates a first natural language processing model 100 that shows how layers of a machine learning model can be pretrained using the disclosed implementations. Natural language processing model 100 is an example of a machine learning model that can be used to perform one or more natural language processing tasks, as discussed more below. For the purposes of this document, the term "natural language" means language that is normally used by human beings for writing or conversation.

Natural language processing model 100 can receive pretraining examples 102, which can include documents, sentences, phrases, or other representations of language having various components, such as words and/or tokens. The components of the pretraining examples can be processed by embedding layers 104, which include a lexicon encoder 104(1) and a transformer encoder 104(2). Generally, both the lexicon and transformer encoders operate to produce representations (e.g., vectors) that represent individual words or tokens in a vector space where semantically-similar and/or syntactically-similar words, tokens, sentences, phrases, documents, queries, etc., are relatively close to one another, and less semantically-similar or syntactically-similar words, sentences, tokens, phrases, documents, queries, etc., are relatively further apart. These vectors are also referred to herein as "embeddings."

Lexicon encoder 104(1) can produce first embeddings 106, e.g., a sequence of embedding vectors for each word or token in the pretraining examples 102. An input to the lexicon encoder can be a sequence of tokens of length m, $X=\{x_1, \ldots, x_m\}$. Specific tokens can be used to delineate the beginning of each sequence, and to separate individual sentences in a given sequence. The lexicon encoder can map X into a sequence of one embedding vector for each token. In some implementations, these token embedding vectors are constructed by summing corresponding word, segment, and positional embeddings for each token in the pretraining examples 102.

Transformer encoder 104(2) can obtain contextual information for each word or token, e.g., via self-attention, and generate second embeddings 108, e.g., a sequence of context embedding vectors. Self-attention is a mechanism relating positions of tokens within a sentence, paragraph, or document to compute the similarities between those tokens. In some implementations, the transformer encoder is a multi-layer bidirectional transformer encoder that is configured to map the first embeddings 106 into the second embeddings 108. As discussed more below, the second embeddings, or context embedding vectors, can be used as a shared representation of phrases or sentences across different tasks. The context embedding vectors represent the words or tokens as well as the context within which each word or token appears in an underlying document, query, or other input.

The second embeddings 108 can be input to pretraining task layer 110 to perform task-specific processing, as discussed more below. Pretraining task layer 110 can evaluate the second embeddings 108 to produce a pretraining prediction output 112, such as masked token/word prediction and/or next sentence prediction for a self-supervised learning process, as discussed more below. Errors computed during pretraining can be used to adjust the parameters of the pretraining task layer, transformer encoder 104(2), and/or lexicon encoder 104(1), as also discussed more below.

Tuning Model Example

Figure 2:
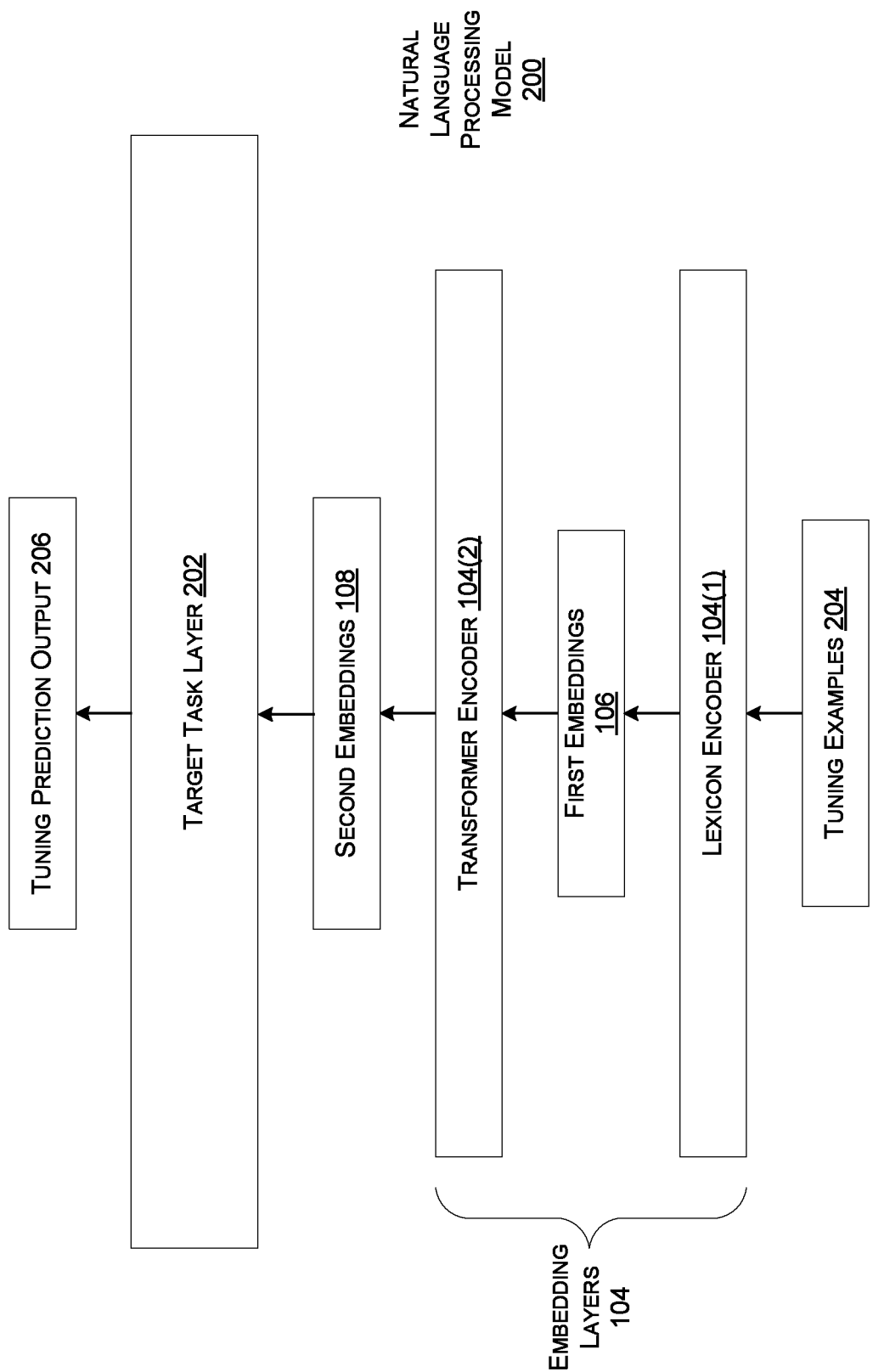
FIG. 2 illustrates an example machine learning model for tuning, consistent with some implementations of the present concepts.

FIG. 2 illustrates an example an exemplary natural language processing model 200 that can be tuned using the disclosed implementations. After pretraining of the lexicon encoder 104(1) and transformer encoder 104(2), these layers can be connected to a target task layer 202 for tuning purposes. As discussed elsewhere herein, the tuning can employ a supervised learning process that adjusts parameters of the lexicon encoder, transformer encoder, and/or the target task layer based on error determined using tuning examples 204. The error can be based on a difference between labels of the tuning examples and tuning prediction output 206 of the target task layer. The following are but a few examples of the types of layers that can be employed for the target task layer.

In some implementations, the target task layer 202 can be a single-sentence classification layer that can label a sentence using class labels. As one specific example, a single-sentence classification layer can predict whether an English sentence is grammatically plausible. Another example classification task is to determine whether the sentiment of a sentence extracted from movie reviews is positive or negative. As discussed more below, the output of the tuning task layer for a classification task can include a corresponding probability for each potential classification. The tuning examples 204 can include labeled examples where the labels identify the correct classification for example sentences.

In other implementations, the target task layer 202 can be a pairwise text similarity layer that performs a regression task on a pair of input sentences. The regression task can involve outputting a real-valued similarity score indicating the semantic similarity of the two sentences. The tuning examples can include labeled sentence pairs where the labels identify semantic similarity between the sentence pairs.

In other implementations, the target task layer 202 can be a pairwise text classification layer that determines a relationship between a pair of input sentences, where the relationship is selected from a set of pre-defined labels. For example, the labels can indicate whether one input sentence has an entailment relationship, a contradiction relationship, or a neutral relationship with respect to the other input sentence. The tuning task layer can output a corresponding probability for each relationship given a pair of sentence examples. The tuning examples can include labeled sentence pairs where the labels identify the correct relationship between the sentence pairs.

In other implementations, the target task layer 202 can be a relevance ranking layer. In such implementations, the model can receive two inputs, e.g., a web search query and a list of candidate documents, and output relevance scores that reflect how relevant each candidate document is to the query. The relevance scores can be used in a subsequent natural language processing operation to rank the candidate answers in the order of relevance to the query.

Example Training Workflow

Figure 3:
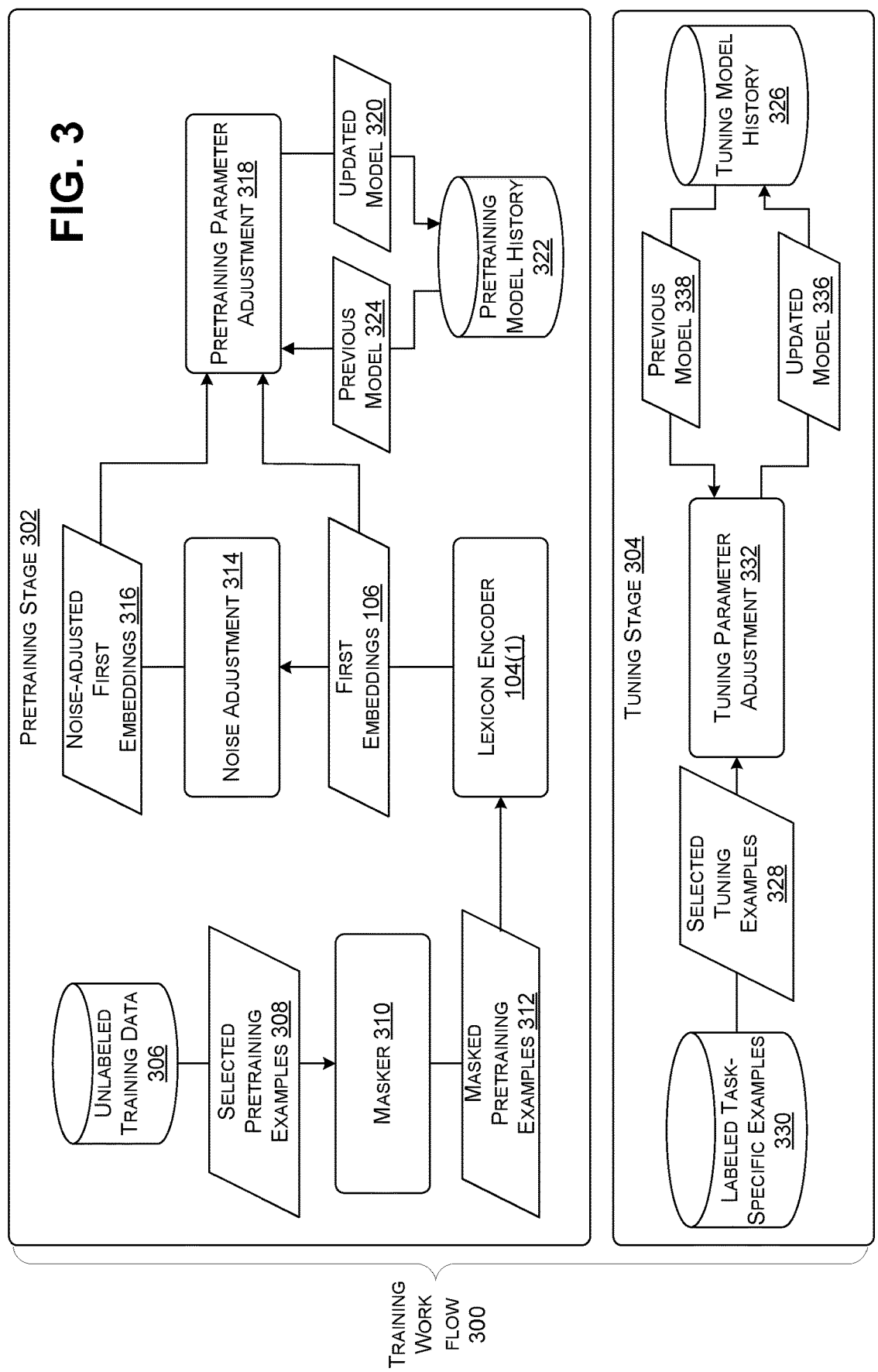
FIG. 3 illustrates an example training workflow for training a machine learning model, consistent with some implementations of the present concepts.

FIG. 3 illustrates an example training workflow 300 for training of a machine learning model, consistent with some implementations. The training workflow is described using the natural language processing model 100 shown in FIG. 1 as an example model for pretraining and natural language processing model 200 shown in FIG. 2 as an example model for tuning, but the training workflow can be performed on many different types of machine learning models.

Training workflow 300 can include a pretraining stage 302 and a tuning stage 304. As discussed more below, the pretraining stage can be used to determine pretrained parameters for one or more layers of a machine learning model, and the tuning stage can be used to adapt those pretrained parameters to a particular target task. As also described more below, in some cases the tuning stage is applied to one or more target task layers that are not pretrained during the pretraining stage.

In some implementations, the pretraining stage 302 can utilize unlabeled training data 306. For instance, the unlabeled training data can provide an unlabeled corpus of documents in a given natural language. The embedding layers 104 can be pretrained by unsupervised learning to predict tokens in the corpus as discussed more below.

First, selected pretraining examples 308 are selected from the unlabeled training data 306. Next, a masker 310 can randomly mask off individual components (e.g., words or tokens) in the selected pretraining examples to obtain masked pretraining examples 312. The masked pretraining examples can be input to lexicon encoder 104(1), which can output corresponding first embeddings 106 for each unmasked component (e.g., word or token) in the selected pretraining examples.

Next, the first embeddings 106 are input to a noise adjustment process 314, which can adjust the first embeddings using a virtual adversarial technique discussed more below to obtain noise-adjusted first embeddings 316. First embeddings 106 and noise-adjusted first embeddings 316 can be input to a pretraining parameter adjustment process 318. In the pretraining parameter adjustment process 318, parameters of the embedding layers and the pretraining task layer 110 are adjusted to obtain an updated model 320, which is then output to a pretraining model history 322. The next pretraining iteration can proceed by retrieving the previous model 324 from the pretraining model history 322 and continuing with pretraining iterations until a stopping condition is reached, e.g., the model converges, achieves a threshold accuracy on a test data set, a training budget is exhausted, and/or all the unlabeled training data 306 has been exhausted.

After the pretraining stage 302, the embedding layers and the target task layer 202 (FIG. 2) can be tuned together in tuning stage 304. Initially, the pretrained parameters of the embedding layers can be provided in tuning model history 326, along with initialized (e.g., random) parameters for the target task layer 202. Collectively, the pretrained parameters of the embedding layers and the initialized parameters of the task-specific layer form a first iteration of the natural language processing model 200. As discussed more below, subsequent tuning iterations can be used to revise these initial parameters to obtain subsequent iterations of the machine learning model.

One specific tuning approach is to use a stochastic gradient descent technique to train the parameters of the embedding layers 104 and the target task layer 202 using selected tuning examples 328 from labeled task-specific examples 330. In each training iteration or epoch, a batch of labeled training task-specific examples can be selected and input to a tuning parameter adjustment process 332. In the tuning parameter adjustment process, the model parameters are tuned to obtain an updated model 336, which is then output to the tuning model history 326. The next tuning iteration can proceed by retrieving the previous model 338 from the tuning model history and continuing with tuning iterations until a stopping condition is reached, e.g., the model converges, achieves a threshold accuracy on a test data set, a training budget is exhausted, and/or all the labeled task-specific examples 330 have been exhausted.

Runtime Model Example

Figure 4:
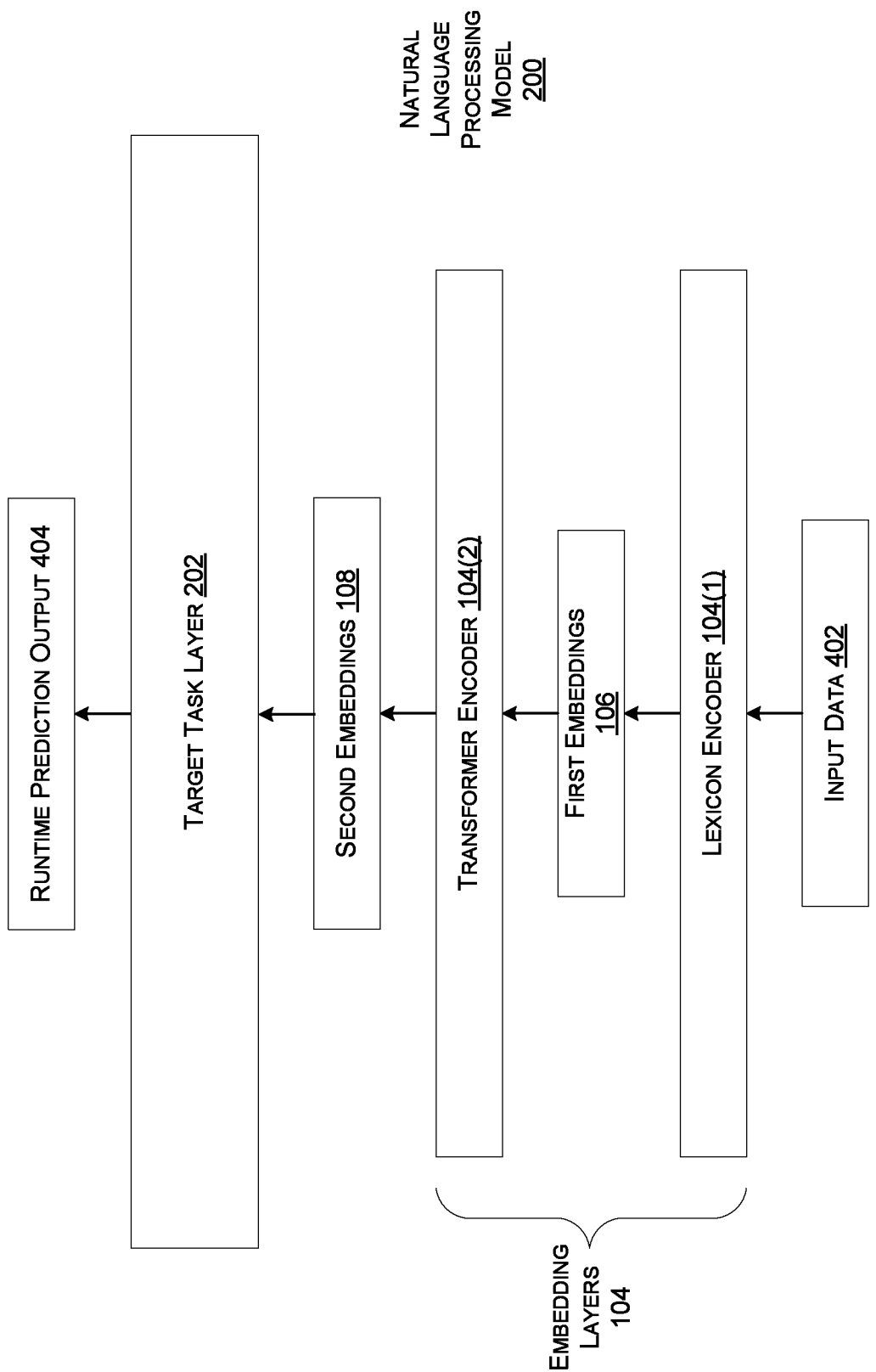
FIG. 4 illustrates an example machine learning model for performing predictions at runtime, consistent with some implementations of the present concepts.

After pretraining and tuning, the natural language processing model 200 can be employed at runtime as shown in FIG. 4. First, input data 402 (e.g., a sentence, query, paragraph, etc.) can be input to lexicon encoder 104(1). The lexicon encoder can encode components (words or tokens) of the input data to obtain first embeddings 106 and provide these to the transformer encoder 104(2). The transformer encoder 104(2) can produce second embeddings 108 and provide these to the target task layer 202. The target task layer 202 can produce a runtime prediction output 404. For instance, the runtime prediction output can provide a distribution of probabilities for a set of defined classifications, as discussed elsewhere herein.

Note that FIG. 4 and FIG. 2 both illustrate natural language processing model 200. In FIG. 2, natural language processing model is shown processing tuning examples, and in FIG. 4, natural language processing model is shown processing input data. Also, note that first embeddings 106 and second embeddings 108 are shown in each of FIGS. 1, 2, and 4 generically, In practice, these embeddings will change as a function of the data being processed during pretraining, tuning, and at runtime.

Additional Details

As noted, natural language processing models 100 and 200 can be neural networks with multiple layers. The layers can include one or more mapping layers that produce representations of input data. For example, as discussed above, the one or more mapping layers can include a lexicon encoder (e.g., a first mapping layer) that maps a sequence of tokens into a sequence of input embedding vectors. The one or more mapping layers can also include a transformer encoder (e.g., a second mapping layer) that maps the input embedding vectors into a sequence of contextual embedding vectors.

In some implementations, noise is added to the output of the first mapping layer, e.g., the lexicon encoder for certain natural language models. In other implementations, noise can be added at other layers of the machine learning model, e.g., to the output of subsequent mapping layers, such as the transformer encoder or other layers that map input data to corresponding representations.

The following provides some more implementation details for natural language models having lexicon and transformer encoders as the mapping layers. In some implementations, the one or more mapping layers can be pretrained by self-supervised learning. One approach involves masking tokens and pretraining the one or more mapping layers with a pretraining task layer to predict the masked tokens bidirectionally, e.g., left-to-right and right-to-left. Another approach involves next sentence prediction. Additional details can be found in Jacob Devlin, Ming-Wei Chang, Kenton Lee, and Kristina Toutanova, "BERT: Pretraining of deep bidirectional transformers for language understanding," 2018, arXiv preprint, arXiv:1810.04805, which is incorporated herein by reference in its entirety.

In some implementations, one or more initial iterations of pretraining are performed without noise adjustment. Subsequently, pretraining can be continued for one or more subsequent iterations using noise adjustment. The noise adjustment can be employed for virtual adversarial training, e.g., as discussed below. Virtual adversarial training can involve using a training objective that encourages the one or more mapping layers to produce a smooth output distribution for pairs of embeddings and corresponding noise-adjusted embeddings. As also discussed below, the noise can be added randomly in an adversarial direction, subject to a perturbation bound.

After the one or more mapping layers are pretrained, the one or more mapping layers and one or more classification layers can be tuned together, e.g., using a supervised learning task. This can be performed using virtual adversarial training and/or using standard supervised learning techniques that do not employ adversarial mechanisms.

Generally, a trained model can be used to perform one or more tasks. In natural language processing scenarios, the trained model can be employed in a search engine, e.g., to match queries to documents or to determine the sentiment of a given sentence. As another example, the trained model can be used in a digital assistant or bot to rank candidate responses to user utterances.

In addition, while natural language models are used herein as examples, the disclosed techniques can be employed for other applications. Consider computer vision, for instance. One or more image mapping layers (e.g., a convolutional layer) can be pretrained using a self-supervised approach, e.g., trying to recover a part of an image that has been removed. Subsequently, a task-specific classification layer can be trained with the image mapping layers to predict object classifications, assign semantic labels to images, etc.

Technical Effect

As noted previously, adversarial training has been shown to improve robustness while tending to hurt generalization. Here, robustness means susceptibility to an attack, and generalization means the ability of a trained model to perform well on new datasets. For instance, consider an image classifier that is trained using adversarial training. Typically, adversarial training encourages the model to duplicate hard labels for training examples after noise is added to the training examples. Thus, for instance, given a labeled image of a cat and the same image of the cat with added noise, adversarial training encourages the model to classify both images as a cat.

This approach has been shown to produce robust models that withstand attacks, e.g., an attacker that adds noise to another image of a cat is much less likely to "fool" a model that has been trained using adversarial training. However, adversarial training has been demonstrated to hurt generalization. Thus, for instance, a model trained using conventional adversarial training may not perform as well on a new dataset with images of cats that have not previously been seen by the model, e.g., such a model may exhibit lower accuracy than a model trained using without adversarial examples.

As discussed more below, however, models pretrained using the disclosed virtual adversarial techniques exhibit both improved robustness and generalization relative to previous techniques. Here, virtual adversarial training encourages the model to produce a similar output distribution for noise-adjusted inputs relative to the output distribution for unadjusted inputs. A transformer pretrained using the virtual adversarial techniques disclosed herein can be subsequently tuned with one or more classification layers, and classifications output by such a model are likely to not only resist attacks better than those with conventionally-pretrained transformers, but also tend to generalize better on new data sets than those with conventionally-pretrained transformers. This is true whether the subsequent training of the transformer and classifier(s) is performed with adversarial training (virtual or otherwise) or using non-adversarial learning techniques.

Furthermore, note that adversarial techniques can be computationally expensive. Specifically, computing the adversarial direction for a given pretraining example can be computationally burdensome. Thus, some implementations may adopt a curriculum approach by performing one or more initial pretraining iterations without adding adversarial noise, and performing subsequent pretraining iterations with added adversarial noise. As discussed more below, this approach can offer the generalization and robustness benefits of adversarial pretraining while reducing the computational expense of performing all pretraining iterations in an adversarial manner.

Algorithmic Details and Experimental Results

The following section provides some algorithmic details on the pretraining stage 302 and the tuning stage 304 shown in FIG. 3. In addition, the following section reports some experimental results on models pretrained and tuned using the disclosed implementations. Specific examples of the disclosed training techniques are referred to below using the term "ALUM." ALUM provides a unifying adversarial training algorithm applicable to pretraining and fine-tuning of machine learning models.

In the following description, MLNI refers to Multi-genre Natural Language Inference, and is a data set with sentence pairs annotated for textual entailment relationships. QQP refers to Quora Question Pairs, which is a dataset of question pairs annotated to indicate whether the questions duplicate the meaning of each other. RTE refers to Recognizing Textual Entailment, which is a dataset of sentences labeled to indicate whether the meaning of one sentence can be inferred from the other. QNLI refers to a question-answering dataset with questions and corresponding answers to the questions that are identified in spans of text provided in the dataset. MPRC refers to Microsoft Research Paraphrase Corpus, a dataset of sentences labeled with paraphrase relationships indicating whether one sentence accurately paraphrases another. CoLA refers to Corpus of Linguistic Acceptability, which is a dataset of sentences labeled for grammatical acceptability. SST refers to Stanford Sentiment Treebank, which is a dataset of examples labeled with positive or negative sentiments expressed by the examples. STS-B refers to Semantic Textual Similarity Benchmark, which is a dataset with labels indicating similarity between two sentences.

Training Objectives

Both pretraining and fine-tuning can be viewed as minimizing or reducing the standard error on training data, with the training objectives derived from self-supervision (without manual labels from, e.g., a human) and direct supervision (labeled examples in task-specific fine-tuning), respectively.

For example, the following training algorithms can seek to learn a classification function $f(x;\theta):x \to C$, parametrized by $\theta$. In masked language modeling (MLM), C is the vocabulary, and $f(x;\theta)$ tries to predict the masked token y. In fine-tuning, C is the task-specific label set, and $f(x;\theta)$ is the classifier. Given a training dataset D of input-output pairs (x,y), the classifier $f(x;\theta)$ can be trained to minimize the empirical risk as:

$$\min_\theta \mathbb{E}_{(x,y)\sim D}[l(f(x;\theta), y)] \qquad (1)$$

where $l(f(x;\theta), y)$ is the loss function (e.g. cross entropy).

Adversarial Training

Pretraining a large neural language model such as BERT, mentioned above, can improve generalization performance in task-specific fine-tuning. However, such models can still suffer from catastrophic loss in adversarial scenarios, with attacks as simple as replacing a few words in input sentences that preserve the semantics.

One approach to improve model robustness and withstand adversarial attacks is adversarial training. Adversarial training can augment the training objective by applying small perturbation to input images that maximizes the adversarial loss:

$$\min_\theta \mathbb{E}_{(x,y)\sim D}\left[\max_\delta l(f(x+\delta;\theta), y)\right], \qquad (2)$$

where the inner maximization can be solved by running a number of projected gradient descent steps. However, adversarial training has a tendency to reduce generalization performance.

The ALUM Algorithm

The following presents an overall training algorithm, ALUM:

Input: T: the total number of iterations, $=\{(x_1,y_1), \ldots, (x_n,y_n)\}$: the dataset, $f(x;\theta)$: the machine learning model parametrized by $\theta$, $\sigma^2$: the variance of the random initialization of perturbation $\delta$, $\epsilon$: perturbation bound, K: the number of iterations for perturbation estimation, $\eta$: the step size for updating perturbation, $\tau$: the global learning rate, $\alpha$: the smoothing proportion of adversarial training in the augmented learning objective.

| 1: | for t = 1,..., T do |
| 2: |   for (x, y) ∈ $\mathcal{X}$ do |
| 3: |     $\delta \sim (0, \sigma^2 I)$ |
| 4: |     for m = 1,..., K do |
| 5: |       $g_{adv} \leftarrow \nabla_\delta l(f(x;\theta), f(x+\delta;\theta))$ |
| 6: |       $\delta \leftarrow \Pi_{\|\delta\|_\infty \leq \epsilon}(\delta + \eta g_{adv})$ |
| 7: |     end for |
| 8: |     $g_\theta \leftarrow \nabla_\theta l(f(x;\theta), y)$ |
|    |       $+ \alpha \nabla_\theta l(f(x;\theta), f(x+\delta;\theta))$ |
| 9: |     $\theta \leftarrow \theta - \tau g_\theta$ |
| 10: |   end for |
| 11: | end for |
| Output: $\theta$ | |

ALUM is applicable to both pretraining and fine-tuning. As noted above, the embedding space can be perturbed by adding noise for virtual adversarial training:

$$\min_\theta \mathbb{E}_{(x,y)\sim D}\left[l(f(x;\theta), y) + \alpha \max_\delta l(f(x+\delta;\theta), f(x;\theta))\right]. \qquad (3)$$

Effectively, this introduces an adversarial term that favors label smoothness in the embedding neighborhood, and $\alpha$ is a hyperparameter that controls the tradeoff between standard errors and robust errors.

Experiments conducted with ALUM demonstrated that virtual adversarial training is superior to conventional adversarial training, especially when labels might be noisy. For instance, BERT pretraining uses the masked words as self-supervised labels, but in many cases, they could be replaced by other words to generate completely legitimate new text. This was verified empirically by demonstrating that pretraining benefits from large $\alpha$. In some cases, $\alpha$ is set to a relatively large number, e.g. $\alpha=10$ for pretraining, and $\alpha=1$ for fine-tuning in the following reported experiments.

Compared to standard training, adversarial training can introduce additional computational expense due to the inner maximization. ALUM adopts a curriculum learning approach: first pretrain the model using the standard objective (1); and then continue the training with virtual adversarial training (3).

Referring back to the ALUM algorithm set forth above, lines 4-6 run K projected gradient steps to find the perturbation δ that maximizes the adversarial loss (violation of local smoothness). Note that a larger K leads to a better approximation, but it is more expensive. To have a reasonable trade-off between speed and performance, K=1 was used in the following reported experiments.

Generalization vs. Robustness

The experiments discussed below established that applying adversarial pretraining using ALUM improved both generalization and robustness for a wide range of natural language processing (NLP) tasks. As previously noted, adversarial training is generally thought to hurt generalization. Based on the following results, adversarial pretraining may help overcome the generalization disadvantages previously associated with adversarial training. For instance, by perturbing the embedding space rather than the input space, adversarial training as discussed herein may bias toward on-manifold perturbation than regular perturbation, which helps generalization.

Experiments

The following section reports results for model generalization and model robustness of ALUM compared with other models, including BERT and RoBERTa (Liu, et al., "RoBERTa: A Robustly Optimized BERT Pretraining Approach," arXiv preprint arXiv:1907.11692, 2019). Subsequently, results are reported using ALUM with adversarial fine-tuning.

Datasets and Benchmarks

The following experiments were conducted using three publicly available large-scale raw corpora in total of 82 G words:

Wikipedia is an English Wikipedia dump which contains 13 G raw text after cleaning.

OPENWEBTEXT (Gokaslan and Cohen) (Gokaslan et al., "Openwebtext corpus,") is a large text corpus of 38 G words extracted from Reddit.

STORIES is a subset of CommonCrawl data developed by Trinh and Le (Trinh et al., "A Simple Method for Commonsense Reasoning," arXiv preprint, arXiv: 1806.02847, 2018) for commonsense reasoning (Winograd schemas). It contains 31 G words.

To evaluate model generalization, the GLUE (Wang et al., "Glue: A Multi-task Benchmark and Analysis Platform for Natural Language Understanding," arXiv preprint, arXiv: 1804.07461, 2018) and SQuAD (Rajpurkar et al., "SQuAD: 100,000+ Questions for Machine Comprehension of Text," Proceedings of the 2016 Conference on Empirical Methods in Natural Language Processing, pp. 2383-2392, 2016) (V1.1 and V2.0) benchmarks were used, as well as three named entity recognition (NER) tasks in biomedical domain. To evaluate robustness to adversarial attack, the ANLI (Nie et al. "Adversarial NLI: A New Benchmark for Natural Language Understanding," arXiv preprint, arXiv: 1910-14599, 2019), adversarial SQuAD (Jia and Liang, "Adversarial Examples for Evaluating Reading Comprehension Systems," arXiv preprint, arXiv:1707-07658, 2017), and HELLASWAG (Hampel, "The Influence Curve and its Role in Robust Estimation," Journal of the American Statistical Association, 69(346):383-393, 1974) datasets were employed. Two representative benchmarks were used, MNLI (in GLUE) and ANLI, in the adversarial fine-tuning experiments, combined with three additional datasets: SWAG (Zellers et al. "SWAG: A Large-Scale Adversarial Dataset for Grounded Commonsense Inference," arXiv preprint, arXiv:1808.05326, 2018), SNLI (Bowman et al., "A Large Annotated Corpus for Learning Natural Langage Inference," Proceedings of the 2015 Conference on Empirical Methods in Natural Language Processing (EMNLP), Association for Computation Linguistics, 2015) and SciTail (Khot, et al., "SciTail: A Textual Entailment Dataset from Science Question Answering," AAAI, 2018). These benchmarks cover a wide range of NLP tasks including classification, ranking, regression, machine reading comprehension, and named entity recognition.

Implementation Details

Three types of training were performed for the following experiments: pretraining from scratch, continual pretraining on a well-trained model, and task-specific fine-tuning. The following describes specific, nonlimiting implementations of models that can be built using the concepts disclosed herein.

BERT models were pretrained from scratch using the Wikipedia corpus. ADAM was used as the optimizer with a learning rate of $1 \times 10^{-4}$ which firstly firstly schedules 1% steps warmup and then decays linearly. Diederik Kingma and Jimmy Ba., "ADAM: A Method for Stochastic Optimization," in arXiv preprint arXiv:1412.6980v9. Subsequently, the model was updated for 1 M steps with a batch size of 256. The perturbation size was set as $\epsilon=1\times10^{-5}$, the step size $\eta=1\times10^{-3}$, and the variance of normal distribution $\sigma=1\times10^{-5}$. Since the loss is dominated by the first term in Eq 3, a value $\alpha=10$ was set, and K=1 for training efficiency. The training took 10 days on one DGX-2 machine with 16 V100-32G GPUs.

For continual pretraining on RoBERTa, RoBERTa's default training parameters were used, except a smaller learning rate ($4\times10^{-5}$), and run for 100 K training steps with a batch size of 256 on the corpora of 82 G text. The training took 7 days on two DGX-2 machines.

For fine-tuning with and without adversarial training, ADAM and RADAM (Liu et al., "On the Variance of the Adaptive Learning Rate and Beyond," arXiv preprint, arXiv: 1908.03265, 2019) were used as optimizers with learning rates of $\{5\times10^{-6}, 8\times10^{-6}, 1\times10^{-5}, 2\times10^{-5}\}$. A linear learning rate decaying schedule with a warm-up of 0.1 was applied to all the tasks, unless stated otherwise. The batch size was set to 16, 32 or 64. The dropout rate was set to 0.1 for all the task-specific layers, except 0.3 for MNLI (Williams et al., "A Broad-Coverage Challenge Corpus for Sentence Understanding through Inference," Proceedings of the 2018 Conference of the North American Chapter of the Association for Computational Linguistics: Human Language Technologies, Vol. 1 (Long Papers), pp. 1112-1122, 2018) and 0.05 for CoLA. To avoid gradient exploding, the gradient norm was clipped within 1. All the texts were tokenized using WordPiece and chopped to spans up to 512 tokens. The model was fine-tuned for up to 10 epochs with the provided task-specific training set and the most accurate task-specific model was picked based on its performance on the dev set.

Model Generalization

The following section reports generalization results for pre-trained models via fine-tuning for downstream tasks. In the pretraining-from-scratch setting, the following three models are compared:

BERTBASE is a BERT base model trained 1 M steps with a batch size of 256.

BERT+BASE is similar to BERTBASE, except that it is trained with 1.6 M steps, which takes the same amount of time as that of $ALUM_{BERT-BASE}$, as detailed below.

$ALUM_{BERT-BASE}$ is a BERT model trained using ALUM with the same training setting as that of BERTBASE except that during the course of the 1 M-step training, standard training was employed in the first 500 K steps, and adversarial training in the second 500 K steps. Since each adversarial training step takes approximately 1.4 times longer than a step in standard training, $ALUM_{BERT-BASE}$ takes approximately the same amount of time to train as BERT+BASE.

FIG. 5A shows the results of these models on three benchmark datasets: SQuAD v1.1 and v2.0, and MNLI in GLUE. $ALUM_{BERT-BASE}$ consistently outperforms BERT and BERT+ across all the datasets, e.g., on SQuAD v1.1, $ALUM_{BERT-BASE}$ obtains 2.3% points absolute improvement in F1 score over BERTBASE and 1.2% points over BERT+ BASE. An analysis was performed on accuracy of a fine-tuned $ALUM_{BERT-BASE}$ on MNLI as a function of the number of pretraining steps. When adversarial training was applied after the 500 K-th step, ALUM starts outperforming BERT and the gap grew larger with the number of pretraining steps.

To further validate the generalization of ALUM, pretrained models were fine-tuned and evaluated on three NER tasks in the biomedical domain, which differs dramatically from the Wikipedia corpus used for pretraining. As shown in FIG. 5B, ALUM outperforms BERTBASE on all three tasks, including BC2GM (Smith et al., "Overview of Biocreative II Gene Mention Recognition," Genome Biology, 9 Suppl. 2:S2, 2008), NCBI (Dogan et al., "NCBI Disease Corpus: A Resource for Disease Name Recognition and Concept Normalization," Journal of Biomedical Informatics, 47, 2014) and JNLPBA (Collier and Kim, "Introduction to the Bio-Entity Recognition Task at JNLPBA," Proceedings of the International Joint Workshop on Natural Language Processing in Biomedicine and its Applications (NLPBA/BioNLP), pp. 73-78, 2004).

The following experiments substantiate the generalization merit of ALUM in the continual pretraining setting. The public RoBERTa models were taken as the initial models, and trained them for 100 K steps using the 82 G text dataset. The RoBERTa models use the same network architectures as BERT, but are pre-trained on much larger amounts of texts. They outperform BERT models in many NLP tasks.

Standard continual pretraining was performed on RoBERTa. The results in FIG. 5C show that this failed to produce any significant gains. Potentially, the existing RoBERTa has already been well-trained and it is challenging to achieve further improvements on top of it using standard pretraining approaches.

Next, pretraining was continued with RoBERTaLARGE and RoBERTaBASE using ALUM, and the resultant models are denoted as $ALUM_{RoBERTa-LARGE}$ and $ALUM_{RoBERTa-BASE}$, respectively. These were then fine-tuned on eight downstream tasks of GLUE. The results in FIG. 5D show that both $ALUM_{RoBERTa-BASE}$ and $ALUM_{RoBERTa-LARGE}$ outperform their RoBERTa counterparts on seven out of eight tasks. For instance, consider the results on MNLI-m as an example. $ALUM_{RoBERTa-BASE}$ outperforms RoBERTaBASE by +0.5% accuracy. $ALUM_{RoBERTa-LARGE}$ outperforms $RoBERTa_{large}$ by +0.7% accuracy. These results show that even with a manageable computational cost (i.e., 100 K training steps on 82 G texts), continual adversarial pretraining can improve model generalization over a model such as RoBERTa, and achieve significant improvements on a wide range of downstream NLP tasks.

Model Robustness

The following section describes experiments conducted on three benchmarks including ANLI, HELLASWAG and adversarial SQuAD, to evaluate the robustness of pretrained models. Four datasets were employed as the final ANLI training data, including ANLI, MNLI, SNLI, and FEVER (Thorne et al., "Fever: A Large-scale Dataset for Fact Extraction and Verification," arXiv preprint, arXiv: 1803.05355, 2018). Models were tested on three different rounds having respective difficulty level. The same fine-tuning approaches were performed for both the baseline models and their ALUM counterparts.

FIG. 5E summarizes the results on ANLI. Note that both $ALUM_{BERT-BASE}$ and $ALUM_{RoBERTa-LARGE}$ significantly outperform their counterparts including BERTBASE and $RoBERTa_{large}$ with large margins. For example, $ALUM_{RoBERTa-LARGE}$ obtains 57.0% (vs 49.7%) in terms of accuracy which is 7.3% absolute improvement over $RoBERTa_{large}$. $ALUM_{BERT-BASE}$ not only outperforms counterpart BERTBASE, but also beats BERTLARGE. $ALUM_{RoBERTa-LARGE}$ also outperforms the XLNet by 5.0% (57.0% vs 52.0%) on the ANLI task.

FIG. 5F reports the results on Adversarial SQuAD and HELLASWAG. Note that that adversarial training ALUM improves results on both of these adversarial datasets. For instance, on the setting of AddOneSent in Adversarial SQuAD, $ALUM_{BERT-BASE}$ obtains 4.2% (63.2% vs 59.0%) and 5% (69.8% vs 64.8%) absolute gains comparing with BERTBASE in terms of F1 score and EM, respectively. The gains over $ALUM_{RoBERTa-LARGE}$ is slightly smaller than the BASE counterpart, but it is still significant. For example, it achieves 3.4% (69.4% vs. 66.0%) and 2.1% (75.0% vs. 72.9%) in terms of F1 metrics in the Adversarial SQuAD dataset. Similar observations are found on HELLASWAG. This clearly demonstrates that the pretrained models trained via adversarial training can bring significant improvement on model robustness, as compared with its counterpart without adversarial training. From all the experiments above, this leads to the observations that ALUM can achieve both excellent generalization and exceptional robustness to downstream tasks.

Continuous Adversarial Fine-tuning

The following section explores whether adversarial pretraining techniques are complementary to adversarial fine-tuning. Two representative benchmarks are employed: MNLI and ANLI in this study, using RoBERTaLARGE and $ALUM_{RoBERTa-LARGE}$ as the baseline. The $ALUM_{RoBERTa-LARGE}$ model fine-tuned with adversarial training is referred to as $ALUM_{RoBERTa-LARGE-SMART}$. The adversarial fine-tuning procedure is described in Jiang et al., "Robust and Efficient Fine-Tuning for Pre-trained Natural Language Models through Principled Regularized Optimization," arXiv preprint, arXiv:1911.03437, 2019.

FIG. 5G shows the results on these two downstream tasks. The improvements are significant and consistent. For example, the adversarial fine-tuning technique brings a 0.5% (91.4% vs. 90.9%) additional gain on the MNLI task and a 1.1% (58.8% vs 57.7%) gain on the ANLI task respectively. These empirical results that model performance can be improved with adversarial fine-tuning, even when the pretrained model has already benefited from adversarial pretraining.

Example System

Figure 6:
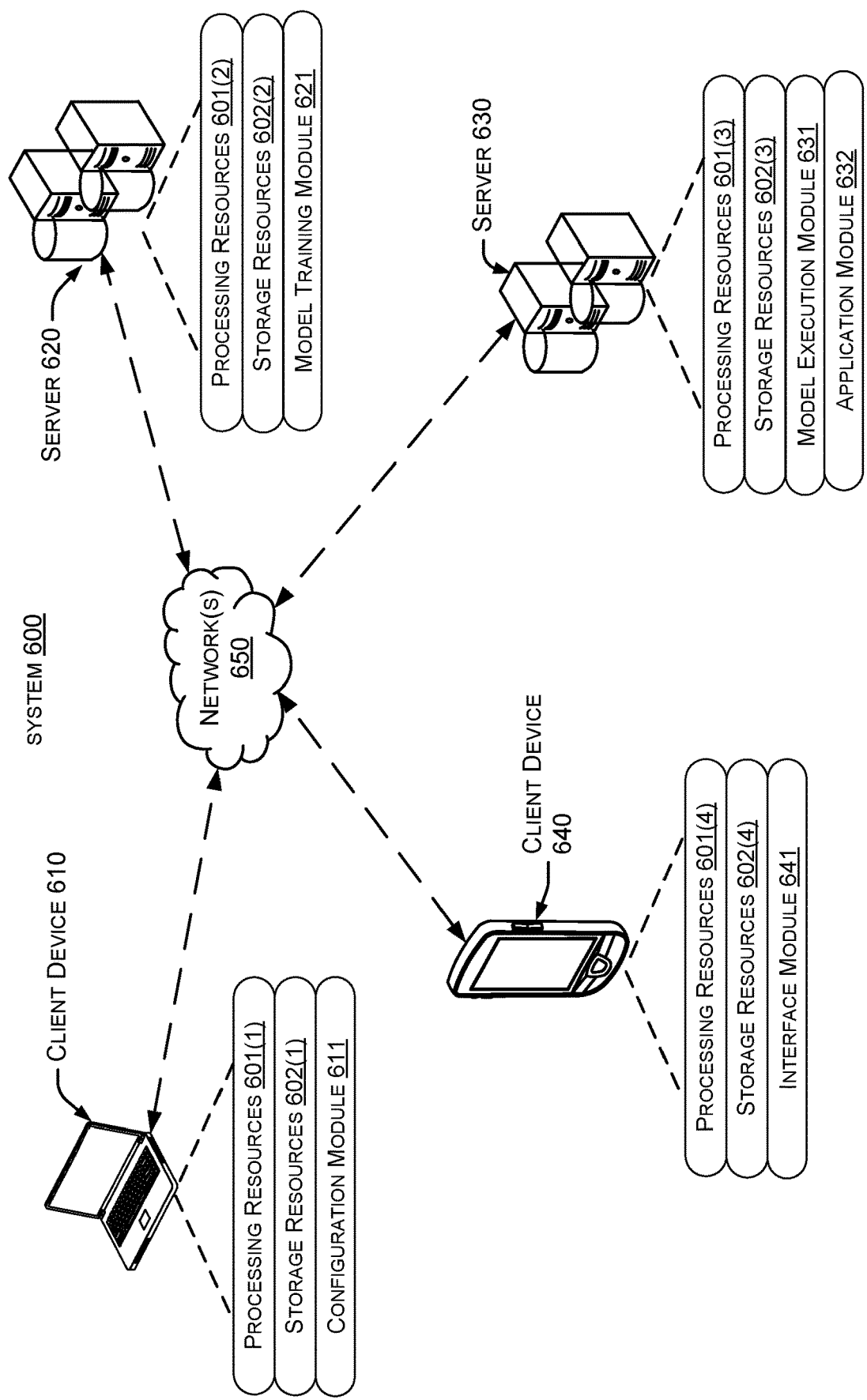
FIG. 6 illustrates an example system, consistent with some implementations of the present concepts.

The present implementations can be performed in various scenarios on various devices. FIG. 6 shows an example system 600 in which the present implementations can be employed, as discussed more below.

As shown in FIG. 6, system 600 includes a client device 610, a server 620, a server 630, and a client device 640, connected by one or more network(s) 650. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 6, but particularly the servers, can be implemented in data centers, server farms, etc.

Certain components of the devices shown in FIG. 6 may be referred to herein by parenthetical reference numbers. For the purposes of the following description, the parenthetical (1) indicates an occurrence of a given component on client device 610, (2) indicates an occurrence of a given component on server 620, (3) indicates an occurrence on server 630, and (4) indicates an occurrence on client device 640. Unless identifying a specific instance of a given component, this document will refer generally to the components without the parenthetical.

Generally, the devices 610, 620, 630, and/or 640 may have respective processing resources 601 and storage resources 602, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 610 can include a configuration module 611 that can interact with a model training module 621 on server 620. Generally speaking, the configuration module can provide certain configuration parameters to the model training module. The configuration parameters can include architecture parameters and training parameters (e.g., hyperparameters). The architecture parameters can specify the structure of a machine learning model, e.g., the number of nodes, arrangement of the nodes in layers, connectivity of the nodes and/or layers, etc. The architecture parameters can also specify input data and output data for each node and/or layer.

The configuration parameters can also include training parameters that specify information such as learning rates or other hyperparameters (perturbation bounds, number of noise-free and noise-induced pretraining iterations, etc.), unsupervised or self-supervised learning parameters and/or data sources, and/or supervised learning parameters and/or data sources. The model training module 621 uses these training configuration parameters to perform model training functionality on a model specified by the architecture parameters. In particular, the model training module can perform training workflow 300 (FIG. 3) based on the training configuration parameters. As just one example, the unsupervised learning data sources can include one or more repositories of sentences, where pretraining stage 302 can involve performing masked language modeling and/or next sentence prediction. As another example, the supervised learning data sources can include task-specific labeled training examples, and/or loss/objective functions for individual tasks.

The model training module 621 can output a trained, final model to server 630. Model execution module 631 can execute the final model in response to received inputs. For example, the interface module 641 on client device 640 can provide input data to an application module 632 executing on server 630. The application module can invoke the model execution module to evaluate the input data on any of the tasks provided in the task-specific layers. The model execution module can process the uploaded input data using the final model and provide output of the model to the application module. The application module can provide the output directly to the client device 640 over network(s) 650, or perform further processing of the output before sending a response to the client device. For instance, the application module might select a review to include in the response based on a sentiment of the review output by the model, or rank documents relative to an input query based on a similarity of the documents to the query as estimated by the model, etc.

Example Method

Figure 7:
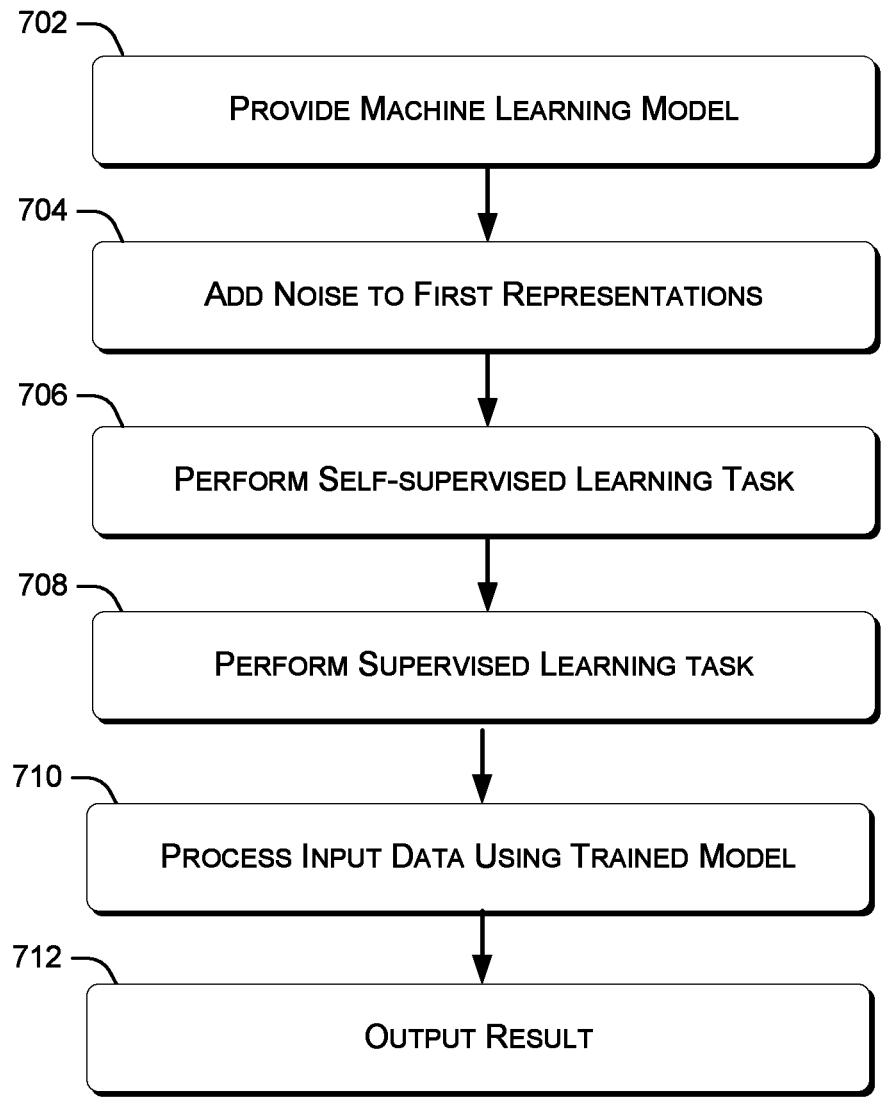
FIG. 7 illustrates an example method or technique for pretraining, tuning, and/or employing a machine learning model, consistent with some implementations of the present concepts.

FIG. 7 illustrates an example method 700, consistent with the present concepts. As discussed more below, method 700 can be implemented on many different types of devices, e.g., by one or more cloud servers, by a client device such as a laptop, tablet, or smartphone, or by combinations of one or more servers, client devices, etc.

Method 700 begins at block 702, where a machine learning model is provided. The machine learning model can have one or more mapping layers, including a first mapping layer that is configured to map components of pretraining examples into first representations in a space. In natural language scenarios, the pretraining examples can include sequences of words or tokens, such as documents, paragraphs, or sentences, and the components can include the words or tokens themselves. In image processing scenarios, the pretraining examples can include images and the components can include portions of the images, other images in a sequence, etc.

The machine learning model can be a neural network, such as discussed in the attached appendices or shown in FIG. 1. Note that block 702 can involve generating an architecture (e.g., node structure, connections between nodes, etc.) of the machine learning model manually or using automated techniques. Alternatively, block 702 can involve receiving the machine learning architecture from a remote device or via user input.

Method 700 continues at blocks 704 and 706, which collectively can correspond to a pretraining stage.

At block 704, the pretraining stage includes adding noise to the first representations to obtain noise-adjusted first representations of the training data items. As noted previously, the noise can be added in an adversarial direction with a random magnitude, subject to a perturbation bound.

At block 706, the pretraining stage includes performing a self-supervised learning task on the one or more mapping layers, using the first representations and the noise-adjusted first representations. In some cases, the self-supervised learning task involves learning from the structure of the pretraining examples. For example, the structure of a document, paragraph, or sentence can be used to learn the meanings of words or tokens. Likewise, a sequence of images (e.g., a video) can convey information about individual objects that are present in the images, or one object in an image can convey information about another (e.g., masked) object in the image.

Method 700 continues at block 708, where a supervised learning task is performed on a classification or regression layer and the one or more mapping layers. As noted previously, the supervised learning task can be performed using labeled training data. The supervised learning task can be performed using conventional, adversarial, and/or virtual adversarial techniques.

Method 700 continues at block 710, where input data is processed using the classification layer and the one or more mapping layers to obtain a result. For instance, the input data can include a query and a document, and the result can reflect a similarity of the query to the document. As another example, the input data can include a sentence, and the result can characterize a sentiment of the sentence. As another example, the input data can include an image and the result can identify a classification of an object in the image.

Method 700 continues at block 712, where the result is output. For instance, the result can be output to a local application, sent over a network, displayed via a user interface, etc.

Example User Experiences

The following describes several user experiences that can be provided using machine learning models that have been trained and/or tuned using the disclosed techniques. For instance, application module 632 on server 630 can generate user interfaces such as those shown below based on output of a machine learning model.

Figure 8:
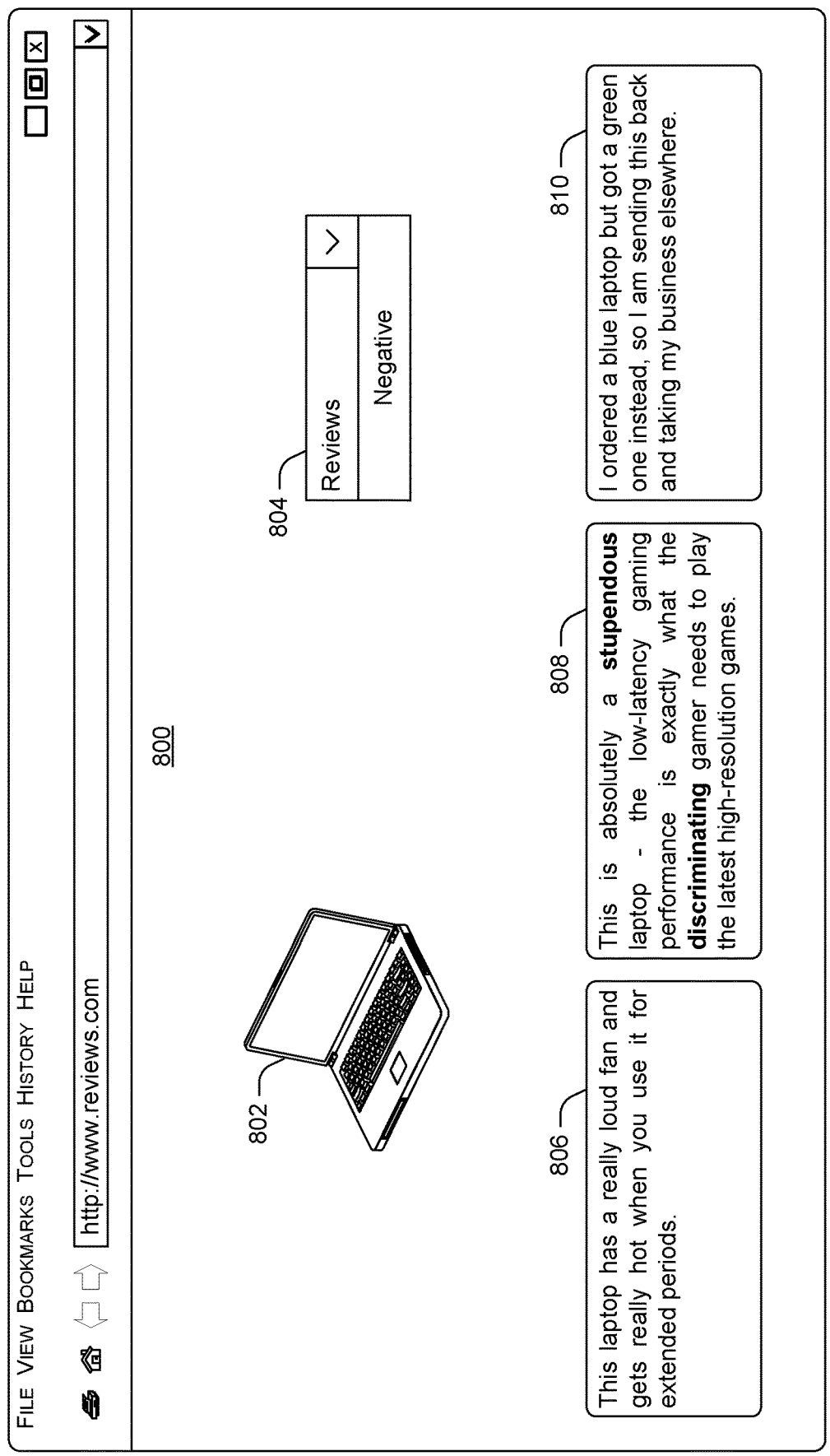
FIGS. 8, 9, 10, and 11 illustrate example user experiences and user interfaces, consistent with some implementations of the present concepts.

FIG. 8 illustrates an example review page 800 for a laptop 802, where the review page is one example of a user interface that can be used to convey reviews to users. Here, a user has selected to filter for negative reviews via a drop-down menu 804, and in response the review page shows three reviews, review 806, review 808, and review 810. Review 806 and review 810 are clearly negative reviews and thus are appropriate to display to the user in response to their request for negative reviews. However, review 808 is a very positive review of the laptop, but includes the terms "stupendous" and "discriminating." A model that not robust could mischaracterize this review as negative, for instance, if these are low-frequency terms that happened to be used in one or more negative example review and the model overfits to those few examples.

Figure 9:
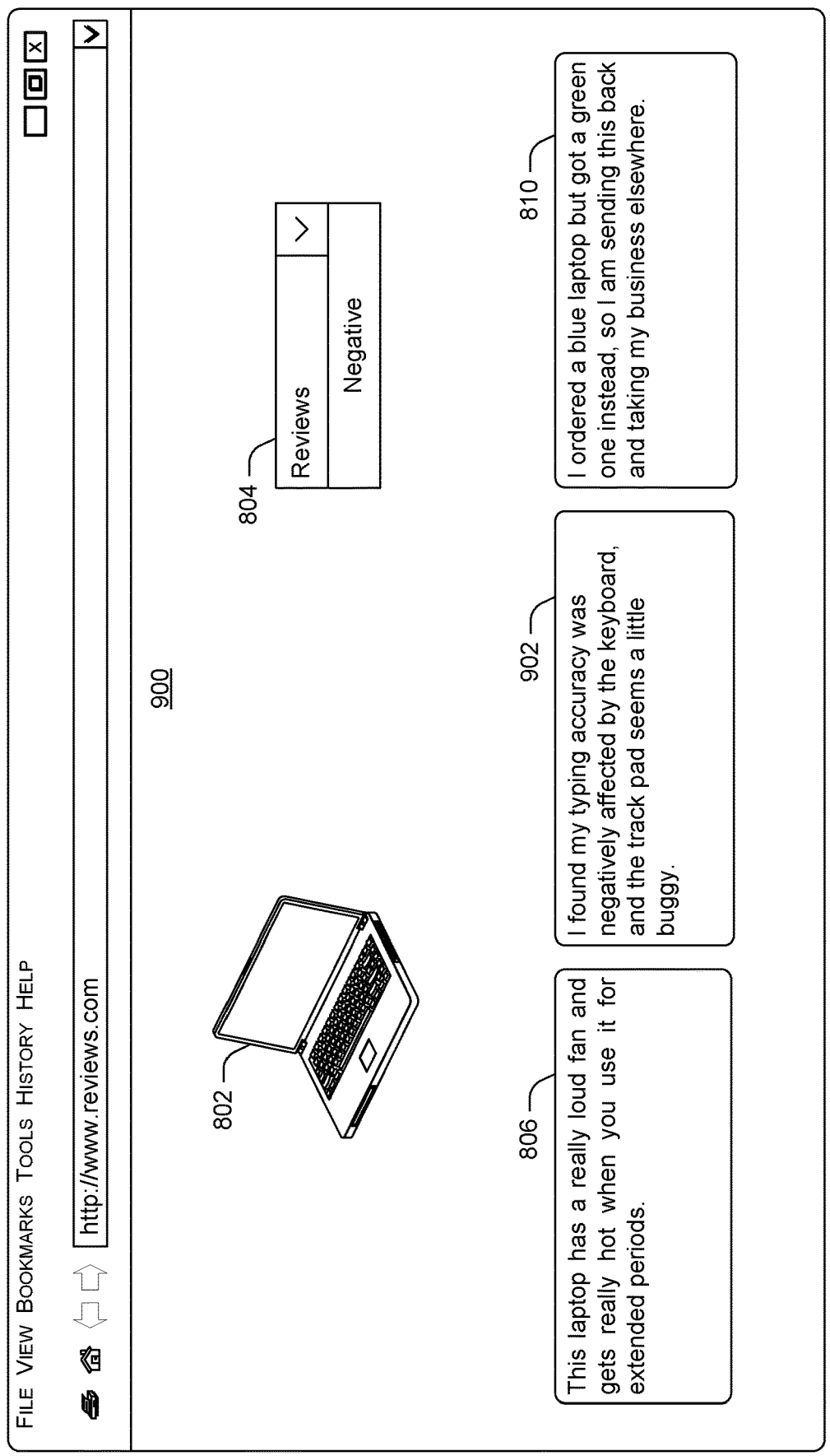

FIG. 9 illustrates an example review page 900 for laptop 802 that could be produced using the disclosed techniques. Here, review 808 has been replaced by review 902, which is actually a negative review and thus correctly displayed to a user who wishes to see negative reviews for the laptop. Because the disclosed implementations provide machine learning models that generalize well to unseen or low-frequency terms, the disclosed implementations may correctly learn that the terms "stupendous" and "discriminating" are not strongly associated with negative reviews and accordingly do not misclassify review 808 as a negative review. More generally, a machine learning model trained using the disclosed implementations can be used to determine whether to output individual reviews in response to a request for negative and/or positive reviews based on sentiments for the reviews as predicted by the machine learning model.

Figure 10:
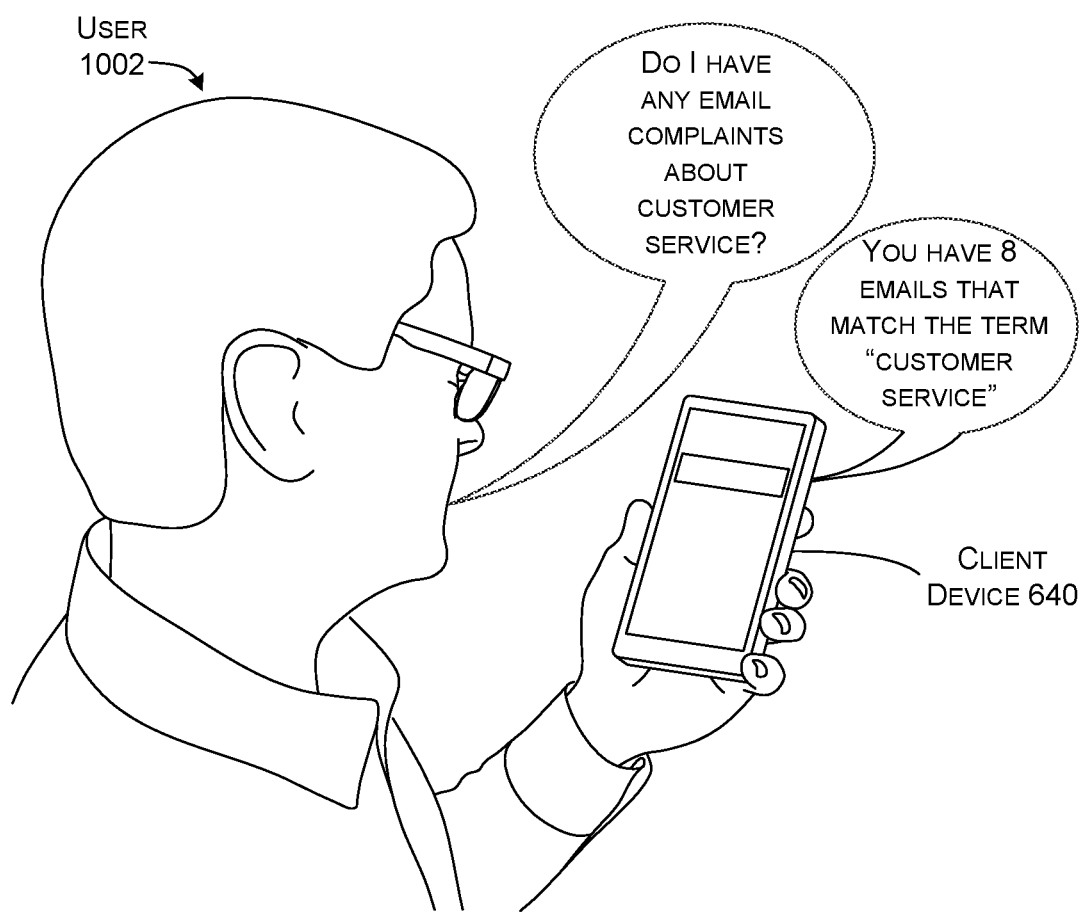

FIG. 10 illustrates an example scenario 1000 where a user 1002 interacts with client device 640. As noted above, the client device can have a local application and/or interact with a server application that can provide search functionality. In this scenario, the user requests that the application determine whether the user has any email complaints about customer service. The application responds by asking the user if he would like to search his emails for the string "customer service." This search may only reveal results that include this specific string, and may omit other relevant results.

Figure 11:
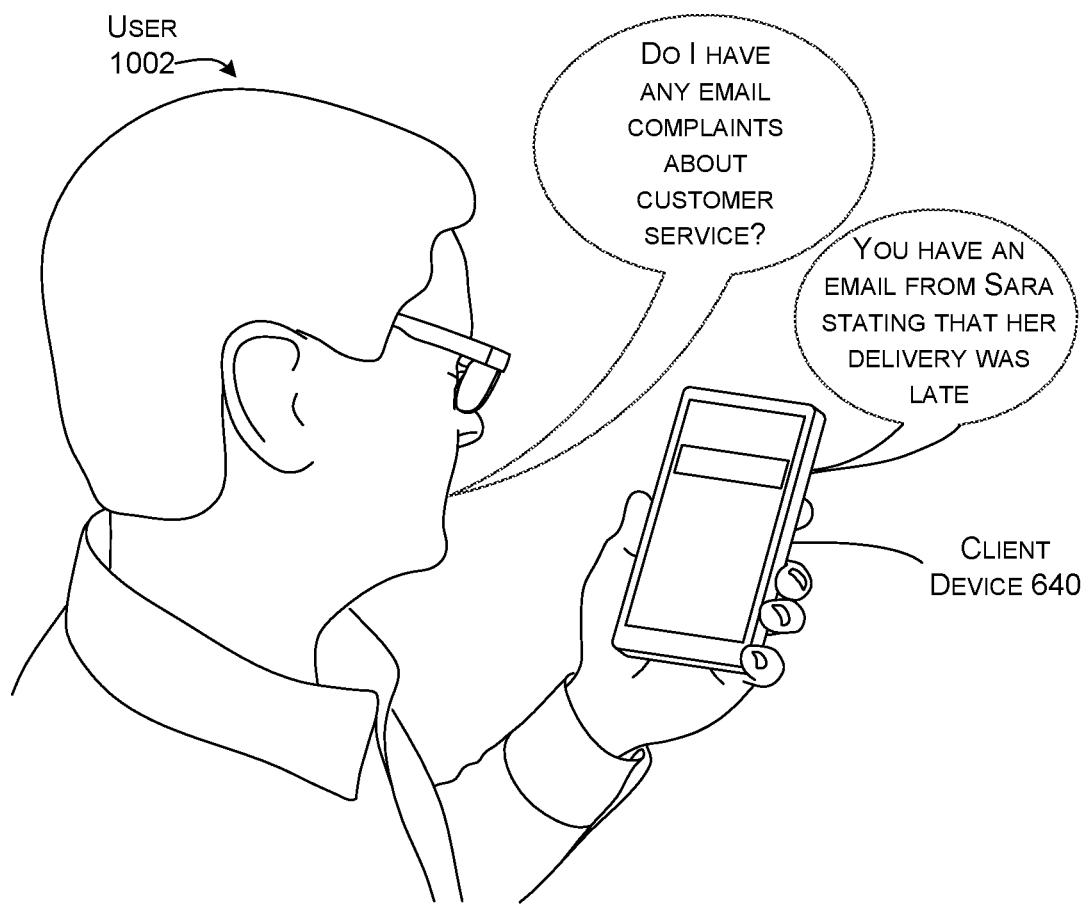

FIG. 11 illustrates an example scenario 1100 where the application has access to a model with a relevance ranking layer that can rank the semantic similarity of a query to multiple answers in a semantic space. This allows the application to provide a flexible search functionality. Here, the user asks for emails about customer service, and the application is able to identify an email from a customer named Sara about a delivery that is late. Here, the email may not include the terms "customer" or "service" or alternative formulations of these terms, and thus may not have been identified by a conventional text search. However, while there may be little textual similarity between Sara's email and these terms, the relevance ranking layer may nevertheless indicate that the query "customer service" is semantically similar to an email complaint about a late delivery. As a consequence, the application is able to identify Sara's email as being responsive to the user's query. More generally, a machine learning model trained using the disclosed implementations can be used to rank documents relative to a query based at least on similarities of the documents to the query as output by the machine learning model.

Device Implementations

As noted above with respect to FIG. 6, system 600 includes several devices, including a client device 610, a server 620, a server 630, and a client device 640. As also noted, not all device implementations can be illustrated, and other device implementations should be apparent to the skilled artisan from the description above and below.

The term "device", "computer," "computing device," "client device," and/or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and/or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor,"

"hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 650. Without limitation, network(s) 650 can include one or more local area networks (LANs), wide area networks (WANs), the Internet, and the like.

Various examples are described above. Additional examples are described below. One example includes a method performed on a computing device, the method comprising providing a machine learning model having one or more mapping layers, including at least a first mapping layer configured to map components of pretraining examples into first representations in a space and performing a pretraining stage on the one or more mapping layers using the pretraining examples, wherein the pretraining stage comprises. The method also comprises adding noise to the first representations of the components of the pretraining examples to obtain noise-adjusted first representations and performing a self-supervised learning process to pretrain the one or more mapping layers using at least the first representations and the noise-adjusted first representations of the components of the pretraining examples.

Another example can include any of the above and/or below examples where the one or more mapping layers comprise a second mapping layer configured to map the first representations and the noise-adjusted first representations into second representations, the second representations reflecting context in which individual components appear with other components in the pretraining examples.

Another example can include any of the above and/or below examples where the first mapping layer comprises a lexicon encoder and the second mapping layer comprises a transformer encoder.

Another example can include any of the above and/or below examples where the pretraining examples comprise sentences, the components comprise words or tokens in the sentences, and the self-supervised learning process comprises at least one of masked word prediction, masked token prediction, or next sentence prediction.

Another example can include any of the above and/or below examples where the method further comprises, after the pretraining stage, performing a supervised learning process on a classification layer and the one or more mapping layers.

Another example can include any of the above and/or below examples where the supervised learning process is performed using adversarial training or virtual adversarial training.

Another example can include any of the above and/or below examples where the classification layer is selected from a group comprising a single-sentence classification layer, a pairwise text similarity layer, and a pairwise text classification layer.

Another example can include any of the above and/or below examples where the pretraining examples comprise images or video, and the one or more mapping layers include a convolutional layer.

Another example can include any of the above and/or below examples where the supervised learning process trains the classification layer to predict classifications of objects in the images or video.

Another example can include any of the above and/or below examples where the method further comprises performing one or more initial training iterations of the self-supervised learning process without the noise-adjusted first representations and performing one or more subsequent training iterations of the self-supervised learning process with the noise-adjusted first representations.

Another example can include any of the above and/or below examples where the adding noise comprises regularizing a training objective using virtual adversarial training.

Another example can include any of the above and/or below examples where the training objective encourages a smooth output distribution of the machine learning model for pairs of first representations and corresponding noise-adjusted first representations of the components of the pretraining examples.

Another example includes a system comprising a hardware processing unit and a storage resource storing computer-readable instructions which, when executed by the hardware processing unit, cause the hardware processing unit to: receive input data, process the input data using a machine learning model having a first layer and a second layer to obtain a result, the first layer having been pretrained in a pretraining stage using virtual adversarial training for a self-supervised learning task, and output the result.

Another example can include any of the above and/or below examples where the virtual adversarial training used in the pretraining stage involves adding noise to representations of components of pretraining examples that are used to adjust parameters of the first layer.

Another example can include any of the above and/or below examples where the input data comprises reviews, the result characterizes sentiments associated with the reviews as predicted by the machine learning model, and the computer-readable instructions, when executed by the hardware processing unit, cause the hardware processing unit to determine whether to output individual reviews in response to a request for negative reviews based at least on the sentiments predicted by the machine learning model.

Another example can include any of the above and/or below examples where the input data comprises a query, the result reflects similarities of the query to a plurality of documents as output by the machine learning model, and the computer-readable instructions, when executed by the hardware processing unit, cause the hardware processing unit to rank the plurality of documents relative to the query based at least on the similarities output by the machine learning model.

Another example includes A computer-readable storage medium storing instructions which, when executed by one or more processing devices, cause the one or more processing devices to perform acts comprising: providing a machine learning model having one or more mapping layers, including at least a first mapping layer configured to map components of data items into first representations in a space, performing one or more initial pretraining iterations of a learning process to train the machine learning model with the first representations, performing noise adjustment on the first representations to obtain noise-adjusted first representations, and performing one or more subsequent pretraining iterations of the learning process to train the machine learning model with the noise-adjusted first representations.

Another example can include any of the above and/or below examples where the first representations comprising embedding vectors, the noise-adjusted first representations comprising noise-adjusted embedding vectors.

Another example can include any of the above and/or below examples where the performing noise adjustment comprises determining an adversarial direction in which to perform the noise adjustment.

Another example can include any of the above and/or below examples where the one or more subsequent pretraining iterations encourage the machine learning model to produce a smooth output distribution for predictions made using the embedding vectors and the noise-adjusted embedding vectors.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:
    performing a pretraining stage on a machine learning model using pretraining examples, wherein the pretraining stage comprises:
        mapping components of the pretraining examples into first representations;
        adding noise to the first representations of the components of the pretraining examples to obtain noise-adjusted first representations; and
        mapping the first representations and the noise-adjusted first representations into second representations, the second representations reflecting context in which individual components appear with other components in the pretraining examples.

2. The method of claim 1, wherein the first representations and the noise-adjusted first representations comprise embeddings.

3. The method of claim 2, wherein the mapping the first representations and the noise-adjusted first representations into the second representations is performed by a transformer encoder.

4. The method of claim 3, wherein the pretraining examples comprise sentences and the components comprise tokens in the sentences.

5. The method of claim 1, wherein the pretraining stage comprises:
    performing one or more initial pretraining iterations of a self-supervised learning process using the first representations without the noise-adjusted first representations; and
    performing one or more subsequent pretraining iterations of the self-supervised learning process with the noise-adjusted first representations.

6. The method of claim 5, wherein the subsequent pretraining iterations involve encouraging a smooth output distribution of the machine learning model for pairs of first representations and corresponding noise-adjusted first representations of the components of the pretraining examples.

7. The method of claim 1, wherein the first representations comprise word embeddings, the noise is added to the word embeddings to obtain noise-adjusted word embeddings, and the word embeddings and the noise-adjusted word embeddings are mapped into the second representations.

8. A system comprising:
    a hardware processing unit; and
    a storage resource storing computer-readable instructions which, when executed by the hardware processing unit, cause the hardware processing unit to:
    receive input data;
    process the input data using a machine learning model to obtain a result, the machine learning model having been pretrained using first representations of components of pretraining examples and noise-adjusted first representations of the components of the pretraining examples, wherein, during pretraining, the first representations and the noise-adjusted first representations were mapped into second representations reflecting context in which individual components appear with other components in the pretraining examples; and
    output the result.

9. The system of claim 8, the machine learning model having been tuned after pretraining to a particular task, the input data being processed to perform the particular task using the machine learning model.

10. The system of claim 9, the task comprising a classification or regression task performed on text.

11. The system of claim 10, the classification or regression task comprising one or more of single-sentence classification, pairwise text classification, or text similarity scoring.

12. The system of claim 9, the machine learning model having been pretrained using self-supervised learning and tuned using supervised learning.

13. The system of claim 12, the self-supervised learning involving a token prediction task performed on a corpus of natural language documents.

14. The system of claim 13, the supervised learning involving predicting labels of natural language training examples from one or more labeled training data sets.

15. The system of claim 11, the classification or regression task comprising text similarity scoring, wherein the input data comprises a query and the result comprises scores reflecting relevance of documents to the query.

16. The system of claim 15, wherein the computer-readable instructions, when executed by the hardware processing unit, cause the hardware processing unit to:
rank the documents according to the scores; and
respond to the query with two or more of the ranked documents based at least on the scores.

17. A computer-readable storage medium storing instructions which, when executed by one or more processing devices, cause the one or more processing devices to perform acts comprising:
obtaining a machine learning model, the machine learning model having been pretrained using first representations of components of pretraining examples and noise-adjusted first representations of the components of the pretraining examples, wherein, during pretraining, the first representations and the noise-adjusted first representations were mapped into second representations reflecting context in which individual components appear with other components in the pretraining examples; and
tuning the machine learning model to perform a particular task using task-specific training data.

18. The computer-readable storage medium of claim 17, wherein the machine learning model was pretrained using self-supervised learning.

19. The computer-readable storage medium of claim 18, the tuning involving supervised learning using labels from the task-specific training data.

20. The computer-readable storage medium of claim 19, wherein the tuning also involves using the noise-adjusted first representations.

21. The computer-readable storage medium of claim 20, wherein the particular task involves text classification.

* * * * *